US008215845B2

(12) United States Patent
Habibvand

(10) Patent No.: US 8,215,845 B2
(45) Date of Patent: Jul. 10, 2012

(54) TANDEM STACK ANGULAR CONTACT BEARING FOR ROTARY WING AIRCRAFT

(75) Inventor: Alex Habibvand, Orange, CA (US)

(73) Assignee: Roller Bearing Company of America, Inc., Oxford, CT (US)

(*) Notice: Subject to any disclaimer, the term of this patent is extended or adjusted under 35 U.S.C. 154(b) by 276 days.

(21) Appl. No.: 11/714,484

(22) Filed: Mar. 5, 2007

(65) Prior Publication Data
US 2007/0269154 A1 Nov. 22, 2007

Related U.S. Application Data

(63) Continuation-in-part of application No. 11/704,762, filed on Feb. 8, 2007, now Pat. No. 8,021,053.

(60) Provisional application No. 60/782,311, filed on Mar. 13, 2006, provisional application No. 60/782,308, filed on Mar. 13, 2006.

(51) Int. Cl.
F16C 19/20 (2006.01)
F16C 33/37 (2006.01)
B64C 11/00 (2006.01)

(52) U.S. Cl. ........ 384/521; 384/514; 384/516; 384/520; 416/133; 416/155

(58) Field of Classification Search .................. 384/470, 384/520–521, 530, 551, 526–527, 576, 613, 384/614; 416/102, 131, 114, 155, 133; 29/898.067
See application file for complete search history.

(56) References Cited

U.S. PATENT DOCUMENTS

| | | | | | |
|---|---|---|---|---|---|
| 2,124,078 | A | * | 7/1938 | Palmer et al. | 416/155 |
| 2,861,849 | A | | 11/1958 | Case | |
| 2,893,792 | A | * | 7/1959 | Wikoff et al. | 384/520 |
| 2,897,021 | A | * | 7/1959 | Zeilman | 384/520 |
| 2,915,129 | A | * | 12/1959 | Laskowitz | 416/97 R |
| 2,961,051 | A | * | 11/1960 | Wilford et al. | 416/131 |
| 2,987,350 | A | * | 6/1961 | Hay | 384/470 |
| 3,208,806 | A | * | 9/1965 | Grolmann et al. | 384/520 |
| 3,220,785 | A | * | 11/1965 | Noll et al. | 384/604 |
| 3,397,019 | A | * | 8/1968 | Day et al. | 384/526 |
| 3,624,815 | A | * | 11/1971 | Schweitzer | 384/533 |
| 3,707,753 | A | * | 1/1973 | Bailey, Jr. | 29/898.067 |
| 3,841,586 | A | * | 10/1974 | Broadley et al. | 416/114 |
| 4,022,516 | A | * | 5/1977 | Smith et al. | 384/520 |
| 4,249,862 | A | | 2/1981 | Waddington et al. | |
| 4,702,627 | A | * | 10/1987 | Pollastro | 384/526 |
| 5,074,494 | A | | 12/1991 | Doolin et al. | |

(Continued)

FOREIGN PATENT DOCUMENTS

FR 2798708 * 3/2001

(Continued)

Primary Examiner — Marcus Charles
(74) Attorney, Agent, or Firm — Michaud-Kinney Group LLP

(57) ABSTRACT

A tandem set of angular contact ball bearings each having an inner ring, an outer ring and balls therebetween, wherein each bearing contains balls that are spaced from each other by slug ball separators. A rotary wing aircraft rotor head assembly includes a rotor head member, a plurality of spindles attached to the head member at equal interval around the center of the head member, and a stack of ball bearings mounted on each spindle. Each bearing has an inner ring, an outer ring, and a plurality of balls between the inner ring and the outer ring, and slug ball separators between adjacent balls, and there is a mounting collar on the ball bearings.

16 Claims, 5 Drawing Sheets

U.S. PATENT DOCUMENTS

| | | | | |
|---|---|---|---|---|
| 5,387,041 A | * | 2/1995 | Lederman | 384/526 |
| 5,409,359 A | * | 4/1995 | Takano et al. | 384/523 |
| 5,597,243 A | * | 1/1997 | Kaiser et al. | 384/551 |
| 5,927,858 A | * | 7/1999 | Agari | 384/520 |
| 6,095,009 A | * | 8/2000 | Takagi | 74/424.88 |
| 6,113,274 A | * | 9/2000 | Horimoto | 384/521 |
| 6,352,367 B1 | * | 3/2002 | Konomoto et al. | 384/45 |
| 6,513,978 B2 | * | 2/2003 | Shirai et al. | 384/45 |
| 6,616,335 B2 | * | 9/2003 | Niwa et al. | 384/51 |
| 6,805,019 B2 | * | 10/2004 | Miyaguchi et al. | 74/424 |
| 7,146,869 B2 | * | 12/2006 | Miyaguchi et al. | 384/521 |
| 7,159,481 B2 | * | 1/2007 | Miyaguchi et al. | 384/521 |
| 7,246,947 B2 | * | 7/2007 | Thompson | 384/516 |
| 2002/0155009 A1 | * | 10/2002 | Panos et al. | 417/407 |

FOREIGN PATENT DOCUMENTS

| | | | |
|---|---|---|---|
| JP | 05209620 A | * | 8/1993 |
| JP | 2001-214930 A | * | 8/2001 |

* cited by examiner

TANDEM STACK ANGULAR CONTACT BEARING FOR ROTARY WING AIRCRAFT

CROSS-REFERENCE TO RELATED APPLICATIONS

This application claims the benefit of U.S. Provisional Patent Application Ser. No. 60/782,311, filed Mar. 13, 2006 and U.S. Provisional Patent Application Ser. No. 60/782,308, filed Mar. 13, 2006, and is a continuation-in-part of U.S. patent application Ser. No. 11/704,762, filed Feb. 8, 2007, which issued as U.S. Pat. No. 8,021,053 on Sep. 20, 2011, all of which are hereby incorporated by reference herein in their entirety.

FIELD OF THE INVENTION

This invention relates to ball bearings, and in particular, to ball bearings in rotary wing aircraft.

BACKGROUND

Rotary wing aircraft, such as helicopters, provide unique environments for the use of ball bearings, particularly in their rotor systems. For example, the bearings in rotor blade mounts must be specially designed to provide reliable ongoing use under the type of load and speed conditions that are unique to helicopters. The use of bearings in other types of machines is nonanalogous to rotary wing aircraft bearings in general and to helicopter bearings in particular. For this reason, bearing designs that are useful in other kinds of machines are not assumed by those of ordinary skill in the art to be suitable for helicopter swashplates, rotor blade mounts, etc.

One example of a conventional rotary wing aircraft bearing is in the tail rotor blade mount of a helicopter such as a Sikorsky CH53A/D helicopter. The blade mount in a Sikorsky CH53A/D helicopter includes a 5-bearing stack of ball bearings. Each bearing in the set is of metric size 70 millimeter (mm)-bore, 110 mm-outer diameter (OD) and 18 mm-width, and has a cross-section of 20 millimeter (mm) [(110-70 mm)/2], which corresponds to a basic 114 ball bearing size that is normally fitted with ½ inch balls. A one-piece, open-ended (one open circular segment) molded nylon cage is used to separate the balls in this bearing. To achieve a minimal cage integrity or strength, to improve cage molding process, and to facilitate cage assembly into bearing, the bearing rings and balls had to be compromised in two respects. First, the bearing ball size of $^{15}/_{32}$ inch had to be used instead of balls sized at ½ inch, which would nominally be used in bearings of this size, as noted above. Second, the outer ring face had to be chamfered heavily to accommodate installation of the cage. The chamfer is currently dimensioned as 110° Max by 53° Max, which raises concerns over its adverse effect on the strength of the outer ring, which is under heavy thrust loads in application.

Based on the foregoing, it is the general object of this invention to provide a bearing for a tail rotor assembly that improves upon prior art bearings.

SUMMARY

The present invention resides in one aspect in a tandem set of angular contact ball bearings each having an inner ring, an outer ring and balls therebetween, wherein each bearing contains balls that are spaced from each other by slug ball separators.

The present invention resides in another aspect in a rotary wing aircraft rotor head assembly comprises a rotor head member having a center, a plurality of spindles attached to the head member at equal intervals around the center of the head member, and a stack of ball bearings mounted on each spindle. Each bearing has an inner ring, an outer ring, and a plurality of balls between the inner ring and the outer ring, and slug ball separators between adjacent balls, and there is a mounting collar on the ball bearings.

DETAILED DESCRIPTION OF THE INVENTION

This invention provides an improvement to rotor blade mount bearings by providing ball bearings that comprise slug ball separators between balls in the bearing, rather than a bearing cage. As a result, a ball bearing meeting the same design constraints as a prior art caged ball bearing can employ larger balls and obviates the need to chamfer either of the races. In addition, the resulting bearing has a surprisingly increased dynamic load rating and fatigue life.

Figure 1:
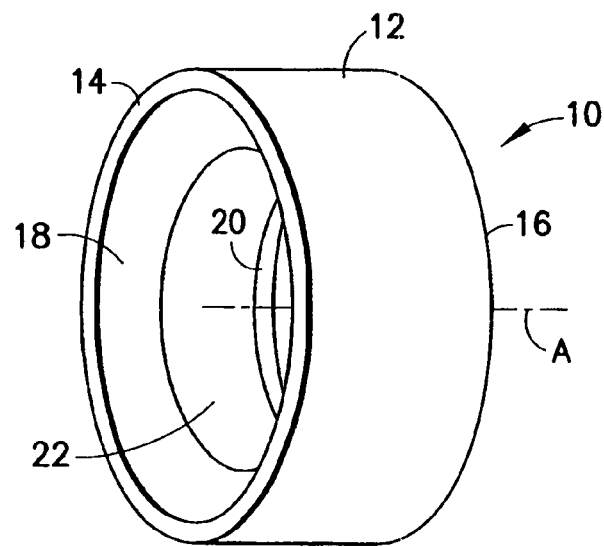
FIG. 1 is a perspective view of one embodiment of a slug ball separator.
Figure 2:
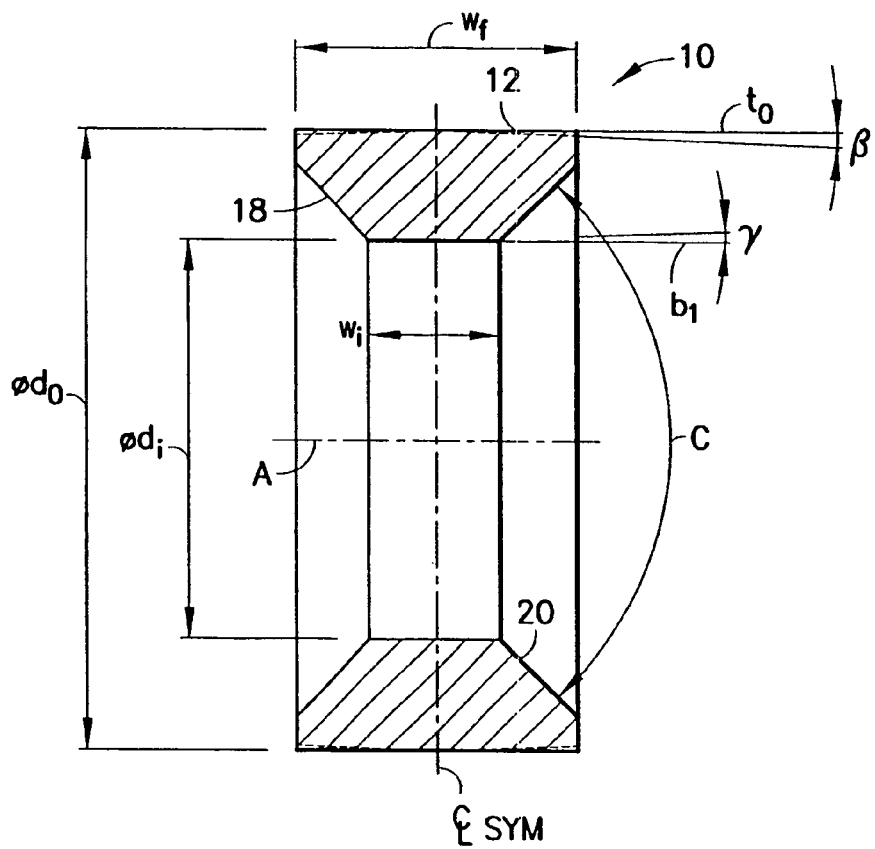
FIG. 2 is a cross-sectional view of the slug ball separator of FIG. 1.

One embodiment of a slug ball separator useful in the present invention is shown in FIG. 1 and FIG. 2. Slug ball separator 10 has a generally annular configuration about a central axis A, two ends and a passage therethrough. The slug ball separator 10 further has a generally cylindrical exterior surface 12 having an external diameter $d_o$, axial end faces 14 and 16, and conical chamfered surfaces 18 and 20 that converge from the end faces 14, 16 towards a generally cylindrical interior surface 22 having an internal diameter $d_i$. Chamfered surfaces 18 and 20 may conform to a conical angle C of about 75° to about 120°, for example, about 90°. Interior surface 22 extends for a distance $W_i$ from the narrow end of chamfered surface 18 to the narrow end of chamfered surface 20.

Exterior surface 12 may be contoured so that its diameter is at a maximum between the end faces; for example, exterior surface 12 may define an angle β of about 3° relative to a tangent line $t_o$ thereon that is parallel to axis A. The diameter $d_o$ of surface 12 from axis A thus decreases moving from the tangent point, which is preferably midway between the end faces, towards either end face. Similarly, interior surface 22 may be contoured to define an angle γ of about 3° relative to a tangent line $b_i$ thereon that is parallel to axis A. Accordingly, the diameter $d_i$ of interior surface 22, measured from axis A, increases moving towards either end face from the tangent point, which is preferably midway between the end faces. The contoured surfaces provided by angles facilitate removal of the slug ball separator 10 from the mold in which it is formed.

Slug ball separator 10 has an axial length $W_f$ measured from end face 14 to end face 16. In a particular embodiment, slug ball separator 10 is designed to be substantially symmetric about a radial centerline CL.

Slug ball separator 10 may be formed from a synthetic polymeric material such as bearing grade PEEK (poly ether ether ketone) or other material e.g., PTFE (polytetrafluoroethylene)(such as TEFLON®), polyimide (such as Dupont's VESPEL®), etc. In particular embodiment, the material is compliant with U.S. military specification MIL-P-46183 as amended 1 Jul. 1999. Preferably, the material will conform to Society of Automotive Engineers, Inc. (SAE) Aerospace Material Specification AMS 3656E issued 15 Jan. 1960, revised 1 Jul. 1993 or AMS 3660C issued March 1966, revised February 1994.

Figure 3:
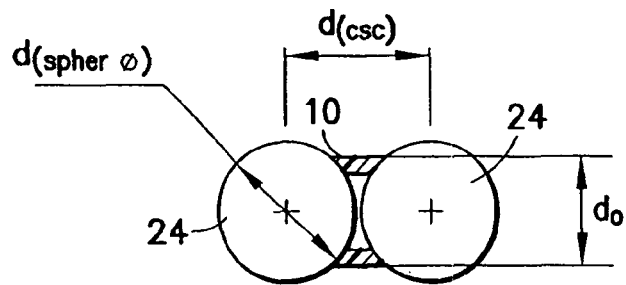
FIG. 3 is a partly cross-sectional view of two balls separated by the slug ball separator of FIG. 1.

Typically, a slug ball separator 10 is used between two like-sized balls that are sized to engage the conical chamfered surfaces 18 and 20. As seen in FIG. 3, the diameter d(spher) of each ball 24 is larger than the outside diameter $d_o$ of slug ball separator 10. In the illustrated embodiment, the ratio of diameter $d_o$ to the ball diameter d(spher) is about 0.85:1. In addition, the slug ball separator 10 is configured to provide a separation between the balls that is equal to about 3.2% to about 64% of a ball diameter, optionally about 3.2 to about 9.6% or, in a specific example, about 6% of a ball diameter. Thus, in a particular embodiment, the center-to-center distance d(csc) of balls in contact with, but separated by, the slug ball separator 10 is about 1.06 times a ball diameter.

Figure 4:
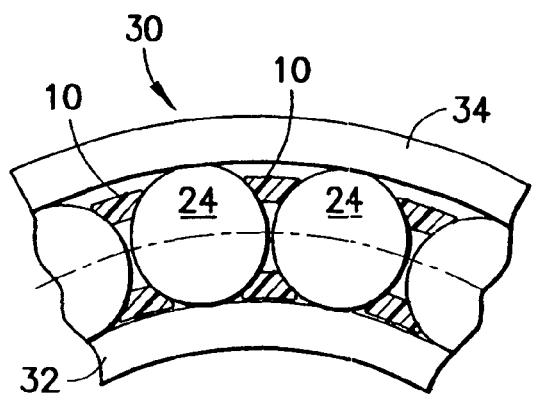
FIG. 4 is a schematic, partly cross-sectional view of a ball bearing for use in a rotary wing system as described herein.

A ball bearing 30 comprising slug ball separators is shown in the partial schematic view of FIG. 4, which shows balls 24 between inner race 32 and outer race 34 and separated from each other by slug ball separators 10. As indicated above, due to the use of slug ball separators 10, ball bearing 30 provides a surprising improvement over a prior art caged ball bearing for the same rotary wing aircraft because it allows the use of a larger ball. For example, a bearing of metric size 70 mm-bore, 110 mm-OD (outside diameter) and 18 mm-width with slug ball separators between the balls can employ a ball of 12.7 mm (½ in.) diameter where a comparative bearing that comprises a nylon separator cage for the balls employs balls of 11.9 mm (15/32 in.) diameter. In addition, the races (rings) are stronger than in the prior art bearing because there is no need to chamfer either race to accommodate a cage. In contrast to a caged bearing, the slug ball separators orbit and flow with minimal resistance to lead-and-lag motions of balls 24 as bearing 30 rotates. These advantages are achieved without impact on bearing features such as contact angle, pitch diameter and the number of balls in the bearing.

Figure 5A:
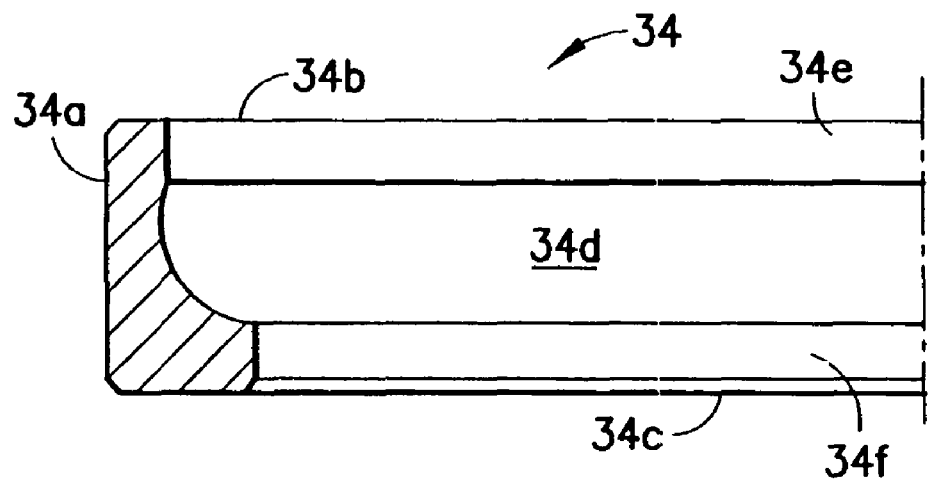
FIG. 5A is a partly cross-sectional view of the outer ring of the bearing of FIG. 4.

The outer ring 34 of bearing 30 is shown in cross-section in FIG. 5A. Outer ring 34 is annular about a central axis (not shown). Outer ring 34 has an annular outside surface 34a that defines the outside diameter of bearing 30, a front face 34b and a back face 34c, both of which are annular and perpendicular to the central axis. The interior surface of outer ring 34 defines an inner raceway 34d. The interior surface of outer ring 34 also includes an annular lead-in surface 34e that is substantially parallel to the central axis and is between the inner raceway 34d and the front face 34b. There is also an annular shoulder surface 34f that is substantially parallel to the central axis and is between inner raceway 34d and back face 34c. In contrast to a comparative bearing made using a cage for the balls, there is no chamfer surface between the inner raceway 34d and the front face 34b. Lead-in surface 34e conforms to a conical lead-in angle of about 1° to about 3° relative to the central axis (and convergent towards the inner raceway 34d), to allow balls to be snapped into the bearing raceway when the inner ring 32 is situated within the outer ring 34, but this is not a chamfer as would be required to accommodate the insertion of a cage after the balls are inserted into the bearing.

Figure 5B:
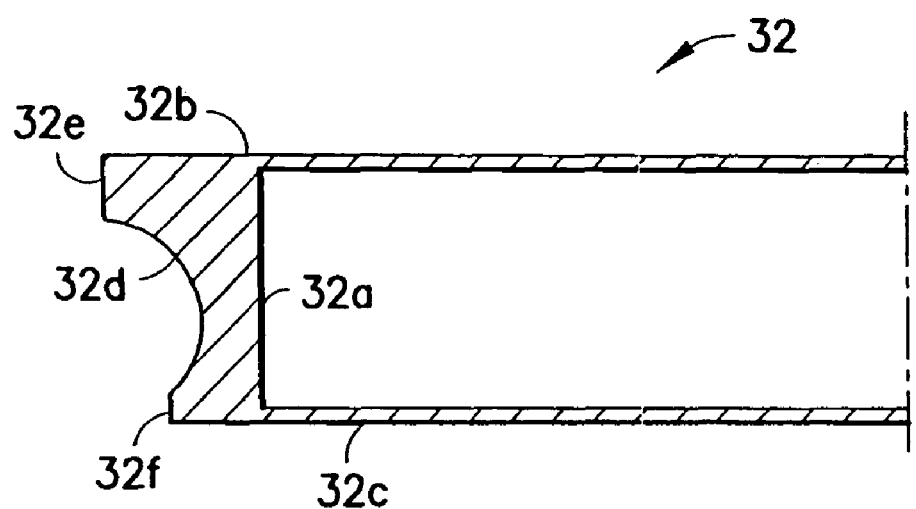
FIG. 5B is a partly cross-sectional view of the inner ring of the bearing of FIG. 4.

The inner ring 32 of bearing 30 is shown in cross-section in FIG. 5B. Inner ring 32 is annular about a central axis (not shown). Inner ring 32 has an annular inside surface 32a that defines the outside diameter of bearing 30, a front face 32b and a back face 32c, both of which are annular and substantially perpendicular to the central axis. The outer surface of inner ring 32 defines an outer raceway 32d. The outer surface of inner ring 32 also includes an annular lead-in surface 32e between the outer raceway 32d and the front face 32b. There is also an annular shoulder surface 32f that is parallel to the central axis and is between outer raceway 32d and back face 32c.

It is readily apparent from FIGS. 5A and 5B that bearing 30 is an angular contact bearing that can support a load in a direction parallel to the central axis of the bearing, due to the asymmetric disposition of the raceways on the rings.

The use of slug ball separators yields a dynamic load rating increase of about 14.5% and a bearing fatigue life increase of about 50% over a bearing having a nylon cage for the balls, according to formulations established in Anti-Friction Bearing Manufacturer Association, Inc. Standard number 9-1990.

Figure 6:
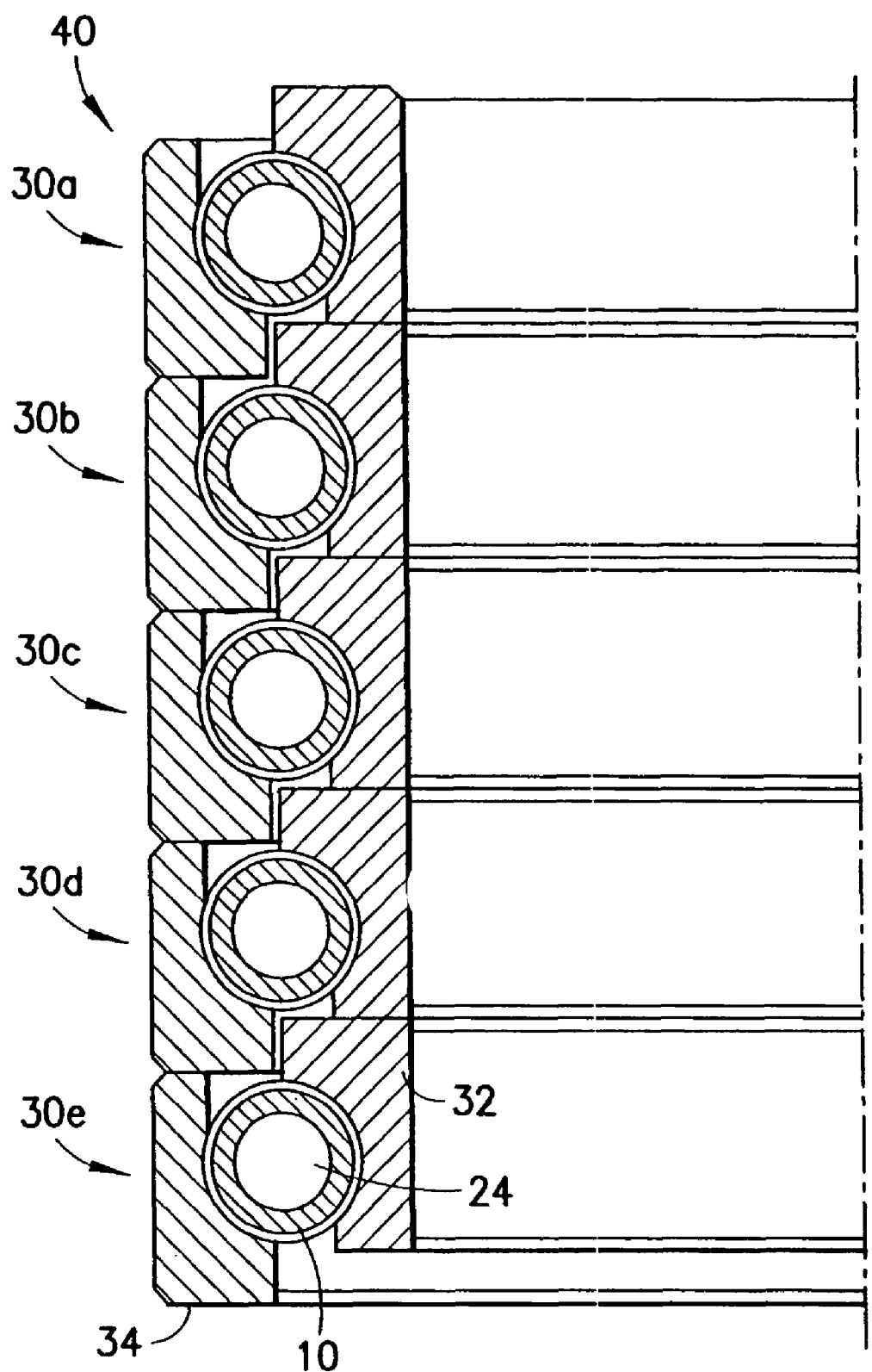
FIG. 6 is a partial cross-sectional view of a ball bearing stack as described herein for use in a tail rotor mount.

In another embodiment, the present invention is utilized in the bearing of a rotor mount. For example, FIG. 6 provides a cross-sectional view of a bearing stack useful in a rotary wing aircraft tail rotor head assembly for a Sikorsky CH53A/D helicopter. Each of the four rotor blades of the tail rotor assembly is fitted with a bearing stack on a respective spindle attached to the rotor head. Bearing stack 40 comprises five matched ball bearings 30a-30e all utilizing the same size balls 24 separated by slug ball separators 10 and dispose between inner races 32 and outer races 34 as described herein. Bearing stack 40 is a sub-component of the tail rotor head assembly that permits the blade to rotate in response to rudder control input. The manufacturer material specification for the rings is AMS 6440 or AMS 6441; the specification for the halls is AMS 6440 or SAE51100. In one evaluation, the use of PEEK or PTFE slug ball separators as described herein resulted in an increase of the dynamic load rating of the bearing by about 14% and an increase of the fatigue life by about 50% relative to the use of nylon cage in the bearing.

Figure 7:
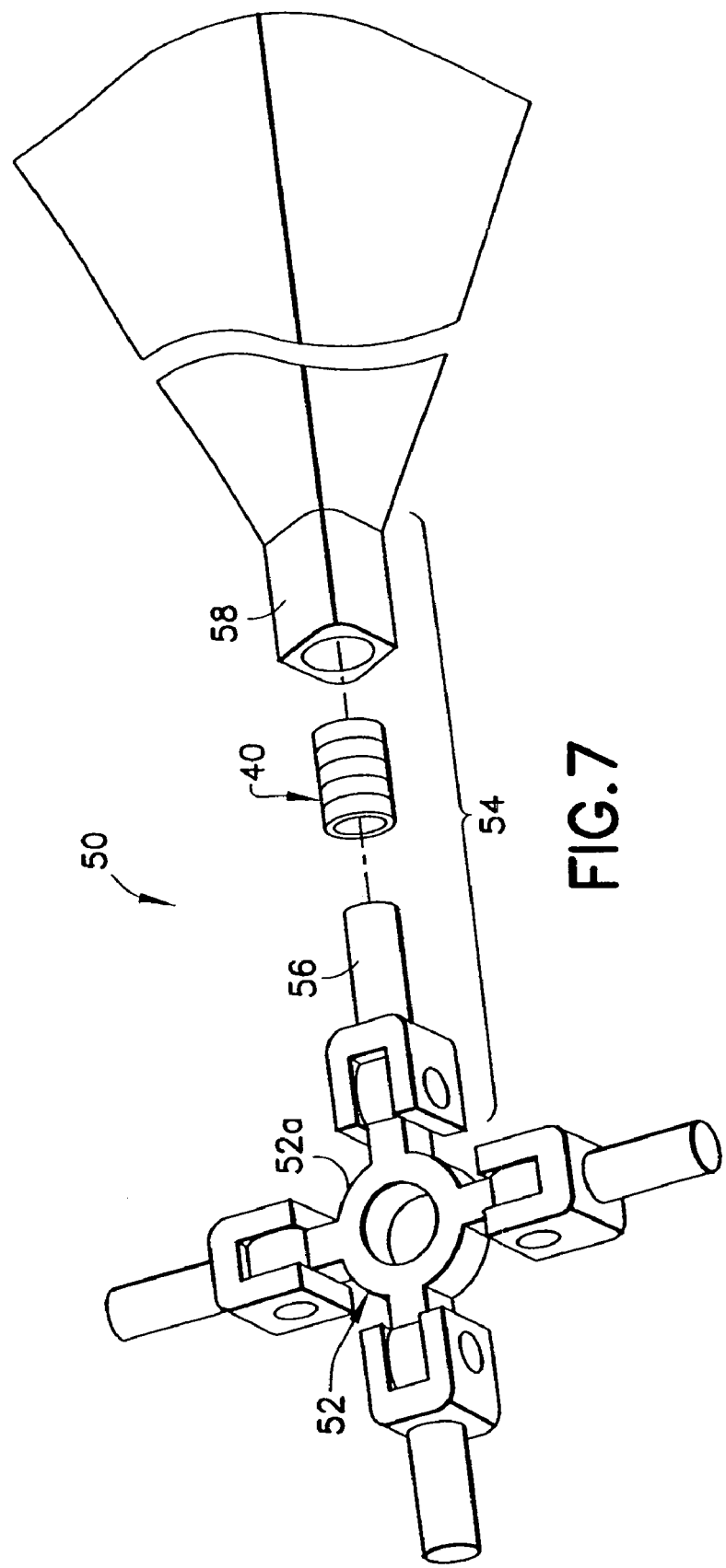
FIG. 7 is an exploded perspective view of a tail rotor head assembly comprising a bearing stack as described herein according to an illustrative embodiment of the invention.

In an illustrative environment of use shown in FIG. 7, bearing stack 40 comprises part of a tail rotor head assembly 50 for a Sikorsky CH53A/D aircraft. Assembly 50 comprises a head member 52 that has a center 52a and that carries multiple (e.g., four) blade mount assemblies 54 at equal intervals (e.g., of 90°) around the center 52a. Each blade mount assembly 54 comprises a spindle 56 on which a bearing stack such as bearing stack 40 is mounted. Each blade mount assembly 54 also includes a mounting collar 58 that is secured to the bearing stack, e.g., bearing stack 40. The mounting collar 58 is thus rotatable in the blade mount assembly 54 and is adapted to have a tail rotor blade mounted thereon. The tail rotor blade is thus rotatable about the spindle 56.

A ball bearing having slug ball separators instead of a nylon cage can also be employed in a rotary wing aircraft swashplate. As is known in the art, a swashplate generally comprises a stationary plate mounted on a mast and a rotating plate mounted on the mast in juxtaposition to the stationary plate. There is a thrust bearing between the stationary plate and the rotating plate to facilitate rotation of the rotating plate.

Figure 8:
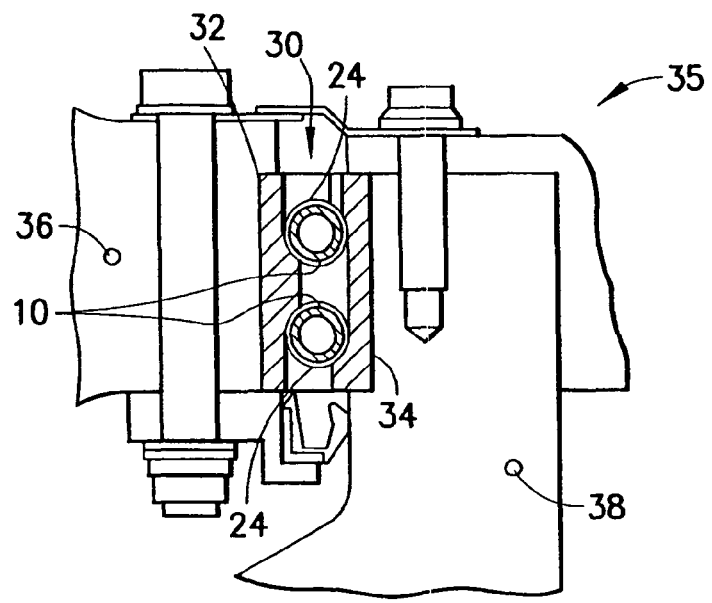
FIG. 8 is a schematic, partly cross-sectional, partly broken-away view of a swashplate assembly comprising the bearing of FIG. 4.

The thrust bearing comprises an inner race and an outer race and a plurality of balls between the inner race and the outer race. In the prior art, the balls were kept in place by a cage. In keeping with the present invention, the bearing comprises slug ball separators between the balls. Thus, the bearing 30 of FIG. 4 is seen in FIG. 8 as a thrust bearing portion of a swashplate assembly. The swashplate assembly 35 comprises a stationary inner swashplate member 36 and a rotating outer swashplate member 38. The inner race 32 of bearing 30 is in contact with the stationary swashplate member 36 and the outer race 34 is in contact with the rotating outer swashplate member 38. Between the inner race 32 and the outer race 34, the bearing 30 comprises a plurality of balls 24 that are separated by slugs 10. The use of slug ball separators yields a dynamic load rating increase of about 14.5% and a bearing fatigue life increase of about 50% over a bearing having a nylon cage for the balls, according to formulations established in Anti-Friction Bearing Manufacturer Association, Inc. Standard number 9-1990

Unless otherwise specified, all ranges disclosed herein are inclusive and combinable at the end points and all intermediate points therein. The terms "first," "second," and the like, herein do not denote any order, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A tandem set of angular contact ball bearings, each of the angular contact ball bearings comprising:
   an inner ring;
   an outer ring;
   balls positioned for rotation between the inner ring and the outer ring, each of the balls having a diameter $d_{(spher)}$; and
   a slug ball separator located between and separating adjacently-positioned balls, the slug ball separator comprising a generally cylindrical member defined by an external surface having a first diameter $d_o$, end faces located at opposing ends of the generally cylindrical member, and a generally cylindrical frusto-conical surface extending from the end faces, the frusto-conical surface defining an inner cylindrical surface having an interior diameter $d_i$, the first diameter ($d_o$) is less than the diameter of the balls ($d_{(spher)}$) such that a ratio of $d_0$ to $d_{(spher)}$ is about 0.85:1.0,
   wherein the external surface defining the generally cylindrical member defines an angle of about 3° relative to a tangent line substantially parallel to an axis extending longitudinally through the slug ball separator.

2. The set of bearings of claim 1, wherein the outer ring does not have a chamfer between an inner raceway of the outer ring and a front face of the outer ring.

3. The set of bearings of claim 1, wherein the separation between two balls in contact with the slug ball separator is equal to about 3.2 to about 64% of the diameter of one of the balls.

4. The set of bearings of claim 1, wherein surfaces of the frusto-conical surface form a conical angle of about 75° to about 120°.

5. The set of bearings of claim 1, wherein the separation between two adjacent balls in contact with a slug ball separator is equal to about 3.2 to about 9.6% of the diameter of one of the balls.

6. The set of bearings of claim 1, wherein the slug ball separator comprises a synthetic polymeric material.

7. The set of bearings of claim 6, wherein the synthetic polymeric material is PEEK, PTFE, or polyimide.

8. The set of bearings of claim 1, wherein the bearings each have an inner diameter of 70 mm and an outside diameter of 110 mm.

9. The set of bearings of claim 8, wherein the set contains five ball bearings.

10. A rotary wing aircraft rotor head assembly comprising:
    a rotor head member having a center;
    a plurality of spindles attached to the head member at equal interval around the center of the head member;
    a stack of angular contact ball bearings mounted on each spindle, each angular contact ball bearing comprising,
    an inner ring,
    an outer ring,
    balls positioned for rotation between the inner ring and the outer ring, each of the balls having a diameter $d_{(spher)}$ and
    a slug ball separator located between and separating adjacently-positioned balls, the slug ball separator comprising a generally cylindrical member defined by an external surface having a first diameter $d_o$, end faces located at opposing ends of the generally cylindrical member, and a generally cylindrical frusto-conical surface extending from the end faces, the frusto-conical surface defining an inner cylindrical surface having an interior diameter $d_i$, the first diameter ($d_o$) is less than the diameter of the balls ($d_{(spher)}$) such that a ratio of $d_0$ to $d_{(spher)}$ is about 0.85:1.0, wherein the external surface defining the generally cylindrical member defines an angle of about 3° relative to a tangent line substantially parallel to an axis extending longitudinally through the slug ball separator; and
    a mounting collar on the angular contact ball bearings.

11. The assembly of claim 10, wherein each angular contact ball bearing has an inner diameter of 70 mm, an outside diameter of 110 mm and a width of 18 mm and comprises balls that are spaced from each other by slug ball separators, the balls each having a diameter of ½ inch.

12. The assembly of claim 10, wherein each angular contact ball bearing contains a set of 21 balls.

13. The assembly of claim 10, wherein the outer ring does not have a chamfer between an inner race of the outer ring and a front face of the outer ring.

14. The assembly of claim 10, further comprising a rotor mounted on the stack of ball bearings.

15. The assembly of claim 10, wherein the slug ball separators comprise a synthetic polymeric material.

16. The assembly of claim 15, wherein the synthetic polymeric material is PEEK, PTFE, or polyimide.

* * * * *